United States Patent [19]
Voss et al.

[11] Patent Number: 5,230,966
[45] Date of Patent: Jul. 27, 1993

[54] COOLANT FLOW FIELD PLATE FOR ELECTROCHEMICAL FUEL CELLS

[75] Inventors: Henry H. Voss, North Vancouver; Clarence Y. Chow, Vancouver, both of Canada

[73] Assignee: Ballard Power Systems Inc., North Vancouver, Canada

[21] Appl. No.: 766,008

[22] Filed: Sep. 26, 1991

[51] Int. Cl.$^5$ .............................................. H01M 8/04
[52] U.S. Cl. .......................................... 429/26; 429/34
[58] Field of Search .................... 429/33, 34, 39, 26

[56] References Cited

U.S. PATENT DOCUMENTS

| | | |
|---|---|---|
| 3,392,058 | 7/1968 | Harrison et al. |
| 3,467,553 | 9/1969 | White ..................... 429/39 |
| 4,729,932 | 3/1988 | McElroy |
| 4,824,741 | 4/1989 | Kunz .................. 429/33 X |
| 4,826,742 | 5/1989 | Reiser |
| 4,973,530 | 11/1990 | Vanderborgh et al. ......... 429/26 X |
| 4,988,583 | 1/1991 | Watkins et al. ......... 429/30 |
| 5,108,849 | 4/1992 | Watkins .............. 429/34 X |

FOREIGN PATENT DOCUMENTS 60-101873  6/1985  Japan ..................... 429/26

OTHER PUBLICATIONS

"Crossed-Linked Polyolefin Foams", William M. Allen Jan./Feb. 1984, pp. 70-71.
"Trocellen Cross-Linked Polyethylene Foam", The New Fashio in Foams for the 1980's.

Primary Examiner—Stephen Kalafut
Attorney, Agent, or Firm—McAndrews, Held & Malloy, Ltd.

[57] ABSTRACT

A coolant flow field plate for use in association with a solid polymer fuel cell comprises, in a major surface, a coolant inlet, a coolant outlet, at least one coolant distribution channel in fluid communication with the coolant inlet and disposed near the perimeter of the plate. At least one central exhaust channel extends along a diagonal of the coolant flow field plate. The central exhaust channel is proximate to the center of the plate and in fluid communication with the coolant outlet. A plurality of coolant flow channels extend from the coolant distribution channels to the central exhaust channel. In the preferred embodiment, the coolant flow channels form a rib-cage pattern with the central exhaust channel. The coolant flow field plate is designed to increase the lifetime of solid polymer fuel cells by imposing lower temperatures near the periphery of the cell plates, and thereby protect the integrity of the seal where the reactant gases are sealed against external leakage.

5 Claims, 5 Drawing Sheets

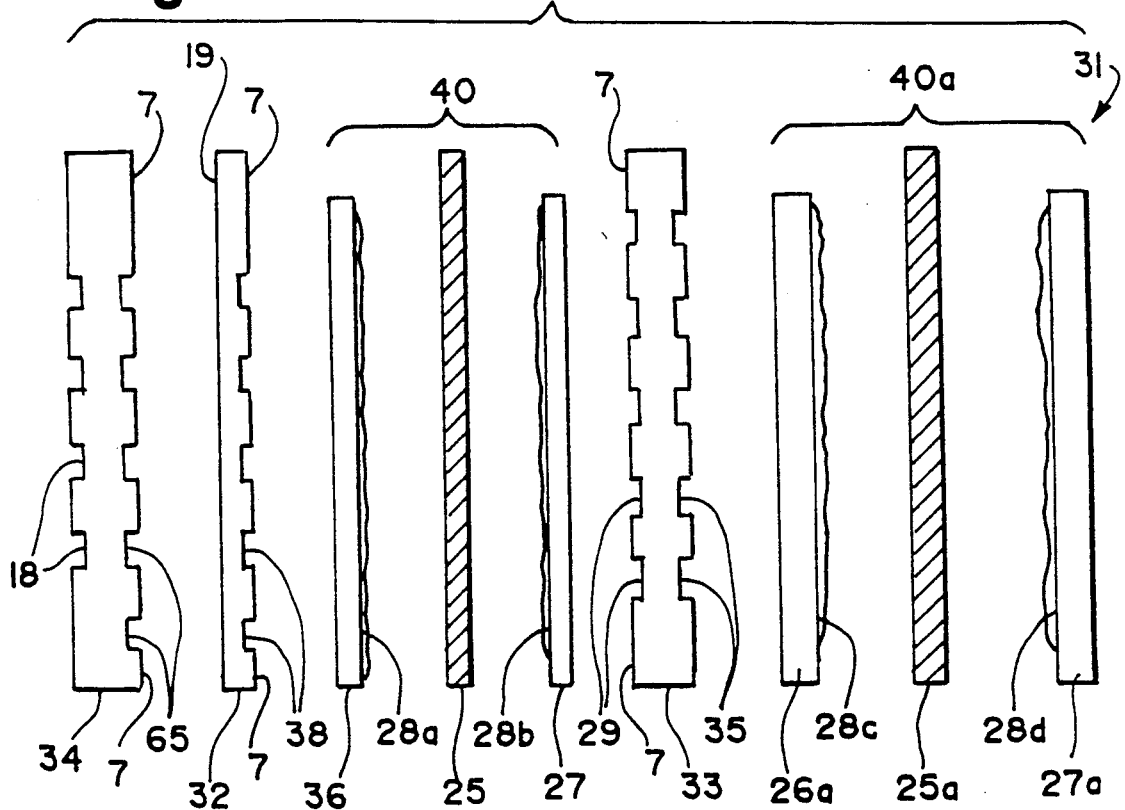
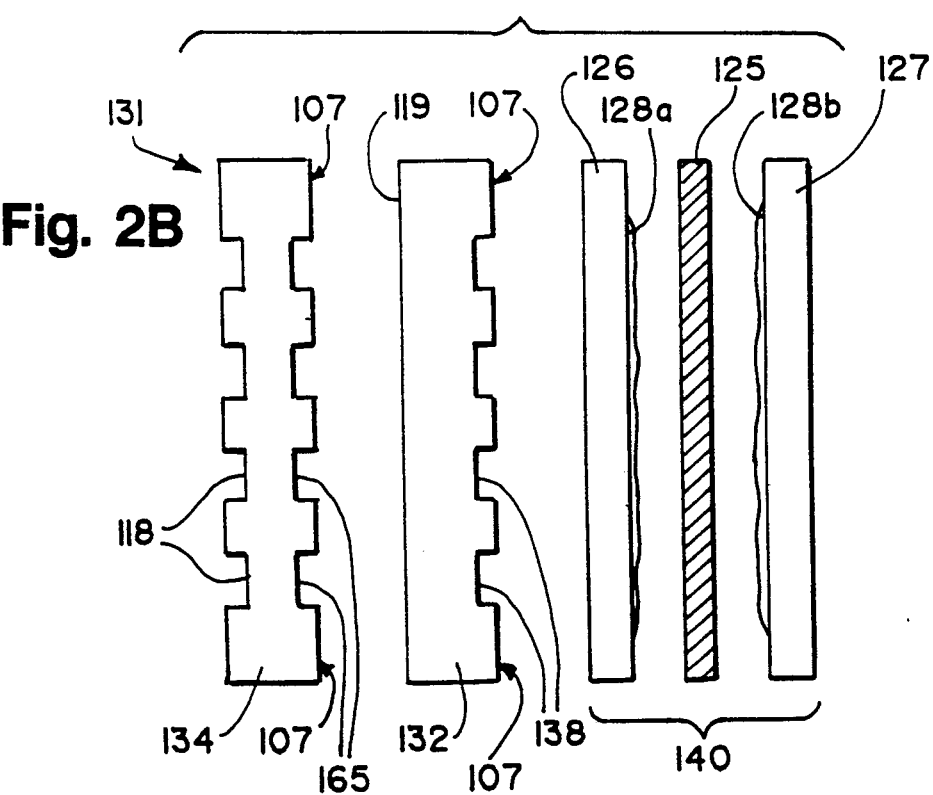

COOLANT FLOW FIELD PLATE FOR ELECTROCHEMICAL FUEL CELLS

FIELD OF THE INVENTION

This invention relates to electrochemical fuel cells, and, in particular, to a coolant flow field plate designed to extend the lifetime of a solid polymer electrolyte fuel cell.

BACKGROUND OF THE INVENTION

Solid polymer electrolyte fuel cells ("SPFCs") generate electricity through the oxidation of a conventional fuel such as hydrogen. The relatively simple design and long demonstrated life of SPFCS make them particularly suitable for both stationary and motive applications.

A single solid polymer electrolyte fuel cell arrangement comprises an ion exchange membrane separating two electrodes, i.e., an anode and a cathode. The anode and cathode typically are sheets of porous carbon fiber paper between which the membrane is interposed. The three-layer anode-membrane-cathode assembly, or membrane electrode assembly, is interposed between electrically conductive graphite separator plates. The graphite plates collect current, facilitate the access of the fuel and oxidant to the anode and cathode surfaces, respectively, and provide for the removal of water formed during the operation of the cell. A plurality of fuel cell assemblies are usually configured together to form an SPFC stack.

To prevent reactant gases from escaping into the atmosphere from between the separator plates in each fuel cell assembly, the portion of the ion exchange membrane extending beyond the electrochemically active region can be used as a gasket seal between the plates. More recent fuel cell designs attempt to conserve expensive membrane material by using gaskets made of elastomeric material around the edges of the graphite separator plates instead of using the membrane itself as a gasket. The membrane material does not extend substantially beyond the electrochemically active region in the more recent design. Instead, the gasket extends between the graphite separator plates along the outer periphery of the plates and around the manifold openings in the plates.

Conventional solid polymer fuel cells are temperature regulated by a cooling fluid circulation system. To maintain proper cell temperature, individual or small groups of fuel cell assemblies are interposed between rigid, electrically conductive plates which form a cooling jacket. A coolant fluid (usually water) is directed through the cooling jacket to absorb heat energy released by the electrochemical reaction within the fuel cell. The heat is transferred to the coolant fluid as a result of the thermal gradient between the reaction site and the coolant.

Typically, flow field grooves are molded or machined on the surfaces of the cooling jacket plates facing the fuel cell assemblies to accommodate cooling fluid distribution and heated fluid elimination. In most water-cooled fuel cell assemblies, the heated water exits through an exhaust manifold and is then used to humidify the incoming fuel and oxidant gases.

The flow field grooves in conventional cooling jacket designs direct the coolant in a "cross-plate" fashion. That is, the coolant essentially flows from one side of the plate to the other. After absorbing heat while passing through multiple flow channels, the warmed coolant is collected in an exhaust channel on one side of the plate and delivered to a coolant outlet or exhaust manifold. The exhaust channel is located along an edge of the cooling plate edge in close proximity to the gasket used to seal the plates.

This conventional cooling jacket design has several disadvantages. One disadvantage arises because the flow of heated cooling fluid at the coolant exit concentrates heat around the oxidant and coolant exhaust channels. This arrangement results in elevated temperatures near the coolant outlet, causing gasket sealing failures and subsequent reactant leaks in the seal area near the exhaust channel. Furthermore, gasket sealing failures can result in contamination of the fuel cell from external impurities, particularly in submersible applications, which can decrease the lifetime of the membrane and the fuel cell components generally.

OBJECTS OF THE INVENTION

It is therefore an object of the invention to provide a cooling jacket flow field plate that is designed to increase the lifetime of solid polymer fuel cells by imposing lower temperatures near the periphery of the cell plates where the reactant gases are sealed against external leakage.

It is a further object of the invention to alter the temperature profile of the fuel cells such that the lowest temperature of the fuel cell is nearest the seal region, thereby protecting the integrity of the seal and reducing related failures of the seal.

Another object of the invention is to provide a more efficient means of heat rejection, allowing for a more compact heat rejection unit within the cell.

A further object of the invention is to provide a uniform temperature distribution across the active area of the membrane electrode assembly.

Another object of the invention is to achieve a higher cooling water exit temperature at the exhaust manifold to provide improved humidification of the reactant gases in the humidification section of the fuel cell assembly.

Further and additional objects will appear from the description, accompanying drawings, and appended claims.

SUMMARY OF THE INVENTION

These and other objectives are achieved by a coolant flow field plate for use in association with a solid polymer fuel cell. The coolant flow field plate comprises in a major surface thereof:

a coolant inlet;

a coolant outlet;

at least one coolant distribution channel in fluid communication with the coolant inlet and disposed in the major surface of the plate, near the perimeter of the coolant flow field plate;

at least one central exhaust channel extending along a diagonal of the coolant flow field plate, the central exhaust channel being proximate to the center of the plate and in fluid communication with the coolant outlet; and a plurality of coolant flow channels extending from the coolant distribution channels to the central exhaust channel.

The coolant flow channels of the preferred coolant flow field plate are substantially parallel and extend substantially perpendicularly to the central exhaust channel. The coolant flow channels preferably form a rib-cage pattern with the central exhaust channel. Alternatively, the coolant flow channels extend substantially radially between a peripheral coolant distribution channel and a central exhaust channel.

The coolant flow field plate is preferably formed from a rigid, electrically conductive material. The channels formed in the coolant flow field plate preferably comprise a bottom wall and opposing side walls diverging outwardly from the bottom wall.

BRIEF DESCRIPTION OF THE DRAWINGS

FIG. 2A is an exploded side view of a first embodiment of a repeating unit of a fuel cell stack showing two membrane electrode assemblies and the corresponding reactant and coolant flow field plates.

FIG. 2B is an exploded side view of a second embodiment of a repeating unit of a fuel cell stack showing one membrane electrode assembly and the corresponding reactant and coolant flow field plates.

DETAILED DESCRIPTION OF THE DRAWINGS

Figure 1:
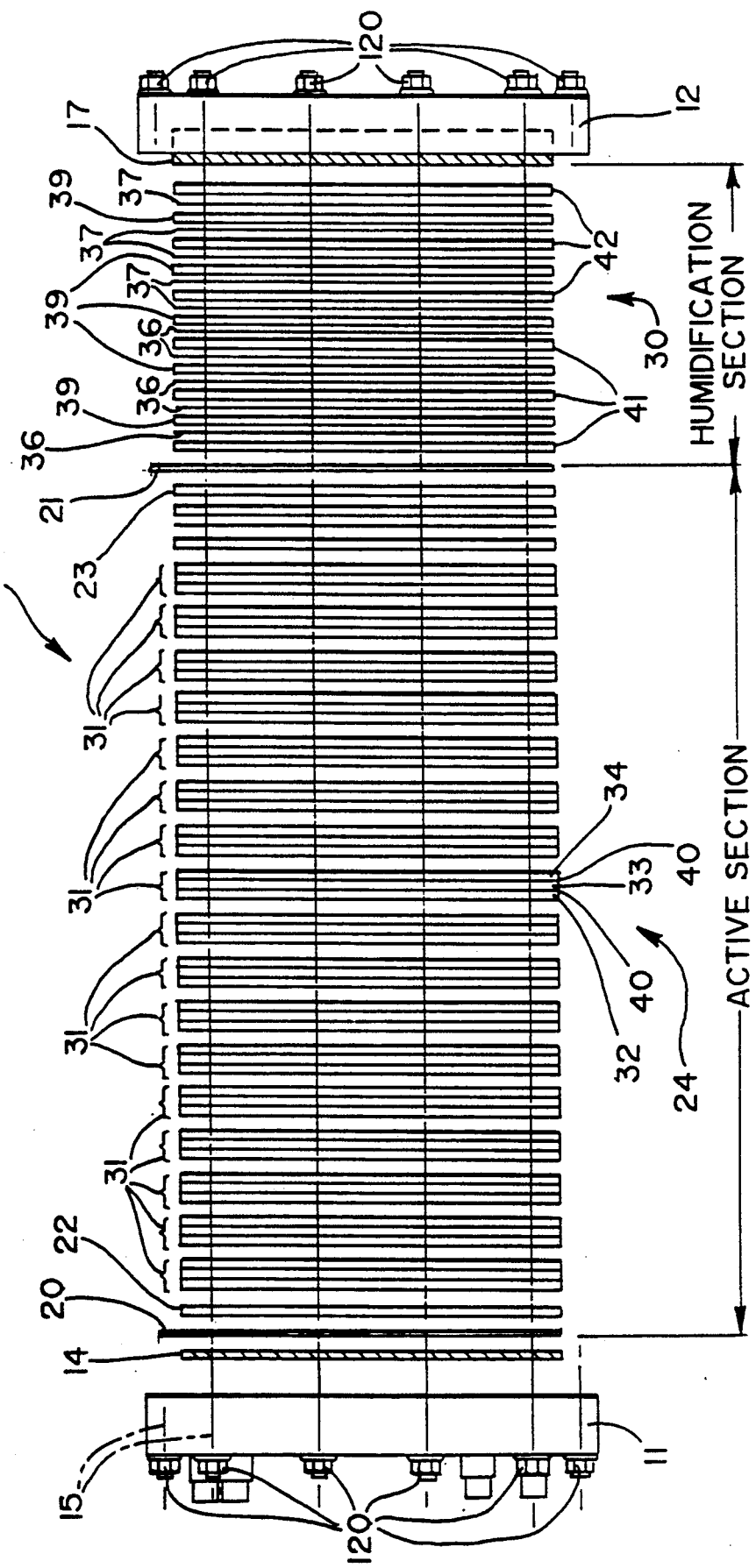
FIG. 1 is an exploded side elevation view of a solid polymer fuel cell stack.

Referring now to the drawings and, in particular, to FIG. 1, a fuel cell stack assembly is generally illustrated in exploded form at 10. The stack assembly includes a pair of end plates 11, 12 which conveniently are, respectively, a fluid end plate 11 and a compression end plate 12. Plates 11 and 12 terminate the stack assembly 10. A plurality of threaded tie rods 15 extend between the end plates 11, 12. Tie rods 15 are secured by tie rod nuts 120 to retain and hold the stack assembly 10 in its assembled condition.

An electrical isolation plate 14 is positioned inside the end plate 11. A piston 17 is positioned within the end plate 12. Bus plates 20, 21 are located on opposite ends of the stack assembly 10 as indicated and carry the voltage and current generated by the stack assembly 10. Cooling water jackets 22, 23 are located immediately inside the bus plates 20, 21.

The stack assembly 10 includes an "active" section, generally illustrated at 24, and a "humidification" section, generally illustrated at 30. The active section 24 includes, in addition to the bus plates 20, 21 and cooling water jackets 22, 23, a plurality of identical assemblies illustrated generally at 31. Each assembly 31 consists of three flow field plates 32, 33, 34 and two membrane electrode assemblies (MEAs) 40 which are interposed between the flow field plates 32, 33, 34. In each assembly 31, the left-most flow field plate 32 carries the fuel in the form of hydrogen gas on one side and, optionally, a coolant fluid in channels on the opposite side of plate 32. Membrane electrode assembly 40 is interposed between plates 32 and 33. The center flow field plate 33 carries the oxidant in the form of oxygen or air on one side and hydrogen on the opposite side. The rightmost plate 34 carries the oxidant on the side adjacent the membrane electrode assembly 40 and, optionally, coolant fluid on the opposite side of plate 34. This configuration of the assembly 31 provides for the hydrogen and the oxidant to be located on opposite sides of each membrane electrode assembly 40 and also provides for a coolant flow field plate to be located adjacent each membrane electrode assembly 40, if desired. This configuration extends throughout the active section 24 of the fuel cell stack 10.

The humidification section 30 of the fuel cell stack 10 includes a plurality of oxidant humidification flow field plates 41 generally located on the left hand side of the humidification section 30 illustrated in FIG. 1 and a plurality of fuel humidification flow field plates 42 generally located on the right hand side of the humidification section 30. The humidification section 30 also includes a plurality of fuel humidification membranes 37 and a plurality of oxidant humidification membranes 36 positioned between the fuel humidification flow field plates 42 and the oxidant flow field plates 41, respectively. Humidification water jacket plates 39 carry humidifying water through the humidification section 30 of the fuel cell.

The humidification section 30 acts to humidify the gases used in the active section of the fuel cell so that the solid polymer ion exchange membranes in the active section 24 remain moist or wet. In general, hydrogen ions will diffuse less readily through solid polymer ion exchange membranes if the membranes are allowed to dry. A lower rate of hydrogen diffusion will in turn reduce overall cell efficiency. The humidification section 30 is intended to prevent the membranes from drying by humidifying the fuel and oxidant gases fed to the active section 24.

The humidification section 24 also differs from the active section 30 in that there is no electrical current produced in the humidification section 30 whereas in the active section 24 electrical current is generated. In the active section, catalyst in the form of platinum is deposited on the surface of the electrodes facing the membrane, rendering that portion of the electrode electrochemically active.

FIG. 2A is an exploded side view of a first embodiment of a repeating unit 31 of fuel cell stack 10. The repeating unit 31 includes two membrane electrode assemblies 40 and 40a. Membrane electrode assembly 40 is interposed between fuel flow field plate 32 and oxidant flow field plate 33. MEA 40 comprises a solid polymer ion exchange membrane 25 interposed between an anode 26 and a cathode 27. The anode 26 and cathode 27 each contains a catalyst layer 28a, 28b, respectively, on the sides facing the membrane 25, rendering them electrochemically active. Flow field plate 32 contains channels 38 through which a fuel, typically hydrogen gas, is transported. Flow field plate 33 contains channels 29 through which an oxidant, typically oxygen or oxygen-containing air, is transported. Channels 35, which are formed in the side of flow field plate 33 facing away from the MEA 40, carry fuel to an adjacent MEA 40a. MEA 40a is identical to MEA 40, comprising a solid polymer ion exchange membrane 25a interposed between anode 26a and cathode 27a. Anode 26a and cathode 27a each contains a catalyst layer 28c, 28d, respectively, to render them electrochemically active. A channel 18 on the side of the flow field plate facing away from the MEA 40 carries oxidant to an adjacent MEA (not shown in FIG. 2A) identical to MEA 40a.

As shown in FIG. 2A, flow field plate 34 contains channels 65 on the side facing the flat surface 19 of flow field plate 32, which carry a coolant, typically water, for absorbing heat generated by the fuel cell. The cooperating sides of the channel 65 and the flat surface 19 form a channel for carrying the coolant fluid. Alternatively, coolant fluid channels like channels 65 could be formed in fuel flow field plate 32 instead of coolant/oxidant flow field plate 34. In this alternative configuration, the cooperating flat surface would be located on the side plate 34 facing MEA 40.

A seal (not shown), either in the form of a preformed gasket, extrudable sealant material, or the membrane itself, seals the perimeter 7 of the flow field plates 32, 33 and 34. Typically, the seal circumscribes the channels, preventing gases and/or water from leaking into the surrounding environment.

FIG. 2B is an exploded side view of a second embodiment of a repeating unit 131 of a fuel cell stack. The repeating unit 131 includes one membrane electrode assembly 140. MEA 140 is interposed between flow field plate 132 and flow field plate 134. MEA 140 comprises a solid polymer ion exchange membrane 125 interposed between an anode 126 and a cathode 127. The anode 126 and cathode 127 each contains a catalyst layer 128a, 128b, respectively, on the sides facing the membrane 125, rendering them electrochemically active. Flow field plate 132 contains channels 138 on the side facing MEA 140 through which a fuel, typically hydrogen gas, is directed to MEA 140. Flow field plate 134 contains channels 118 on the side facing away from MEA 140 through which an oxidant, typically oxygen or oxygen-containing air, is directed to an adjacent MEA (not shown in FIG. 2B) identical to MEA 140.

As shown in FIG. 2B, flow field plate 134 contains channels 165 on the side facing the flat surface 119 of flow field plate 132. Channels 165 carry a coolant, typically water, for absorbing heat generated by the fuel cell. The cooperating sides of the channel 165 and the flat surface 119 form a channel for carrying the coolant fluid. Alternatively, coolant fluid channels like channels 165 could be formed in fuel flow field plate 132 instead of coolant/oxidant flow field plate 134. In this alternative configuration, the cooperating flat surface would be on the side of plate 134 facing MEA 140.

A seal (not shown), either in the form of a preformed gasket, extrudable sealant material, or the membrane itself, seals the perimeter 107 of the flow field plates 132 and 134.

Figure 3:
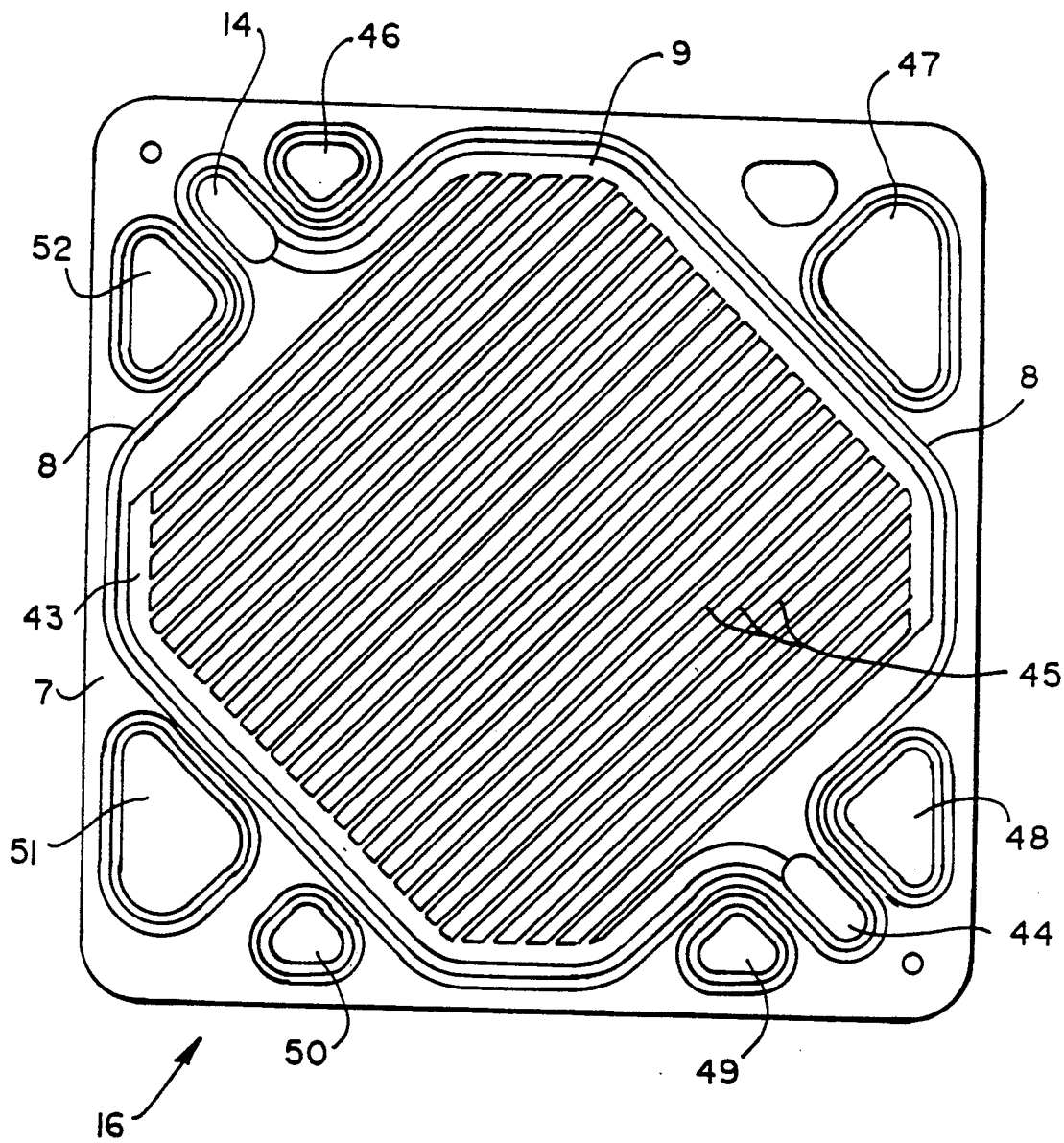
FIG. 3 is a top plan view of a conventional coolant flow field plate.

FIG. 3 illustrates the flow field channels on a conventional cooling flow field plate, such as plate 32 or 34 described above. The plate 16 contains channels which direct the coolant across the plate area. In the illustrated embodiment, cool water enters through the coolant supply manifold 14 and follows the coolant supply channel 9 to one side of the plate. From the coolant supply channel 9, the coolant flows through a plurality of parallel channels 45, absorbing heat from the chemical reaction taking place within the adjacent fuel cell area. Channels 45 empty into the exhaust channel 43 on the opposite side of the plate, and the warmed water then flows out through the exhaust manifold 44. Other fluids and reactants pass through various manifold openings 46–52 in the plate.

Sealant channel 8 circumscribes the coolant flow field. A sealant (not shown) located within the sealant channel 8, such as for example a preformed gasket, extrudable sealant or other appropriate sealant material, performs a sealing function when the plate 16 is compressed against the flat surface of an adjacent plate.

A disadvantage of the conventional plate design shown in FIG. 3 is the close proximity of the exhaust channels 43 and exhaust manifold 44 to the sealant channels of the membrane electrode assembly which are adjacent sealant channels 8 on plate 16. Because the heated coolant fluid collects in the exhaust channel 43 near the sealant channels of the adjacent membrane electrode assembly, this portion of the plate becomes very hot. As a result, the membrane electrode assembly seal area is subjected to high temperatures which can deteriorate the seal and create reactant leaks.

Figure 4:
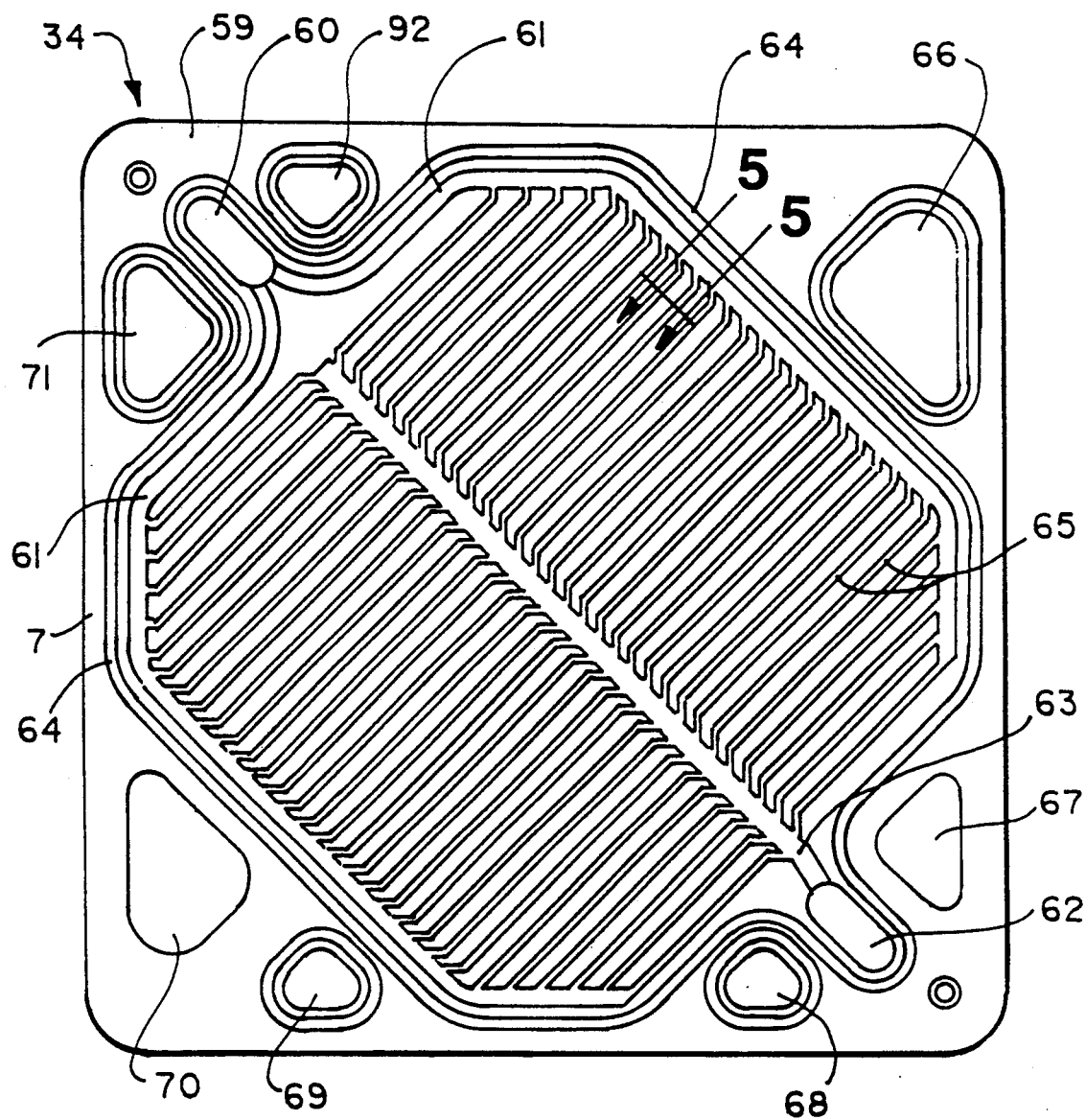
FIG. 4 is a top plan view of a coolant flow field plate having a rib-cage flow pattern in accordance with the present invention.

FIG. 4 illustrates the improved coolant flow field channels in plate 32 and/or plate 34 described above, in accordance with the present invention. A major plate surface 59 has machined, stamped or molded open-faced fluid flow channels 61, 63, 65 throughout the central portion of the plate. The coolant inlet or manifold 60 is connected to two fluid distribution channels 61, which run along the perimeter 7 of the plate 34. A sealant channel 64 circumscribes the coolant flow field near the perimeter of plate 34.

Branching inwardly (toward the center of the plate 34) from each fluid distribution channel 61 are a plurality of coolant flow channels or ribs 65. Channels 65 preferably run substantially parallel to each other. Channels 65 converge on and are connected to a central exhaust channel 63. The central exhaust channel is preferably disposed substantially perpendicularly to channels 65. The central exhaust channel 63 is connected to a coolant outlet or exhaust manifold 62. Various manifold openings 66–72 are located near the perimeter 7 of the plate 34, and conduct reactant gases and other fluids through the coolant flow field plate.

Figure 4A:
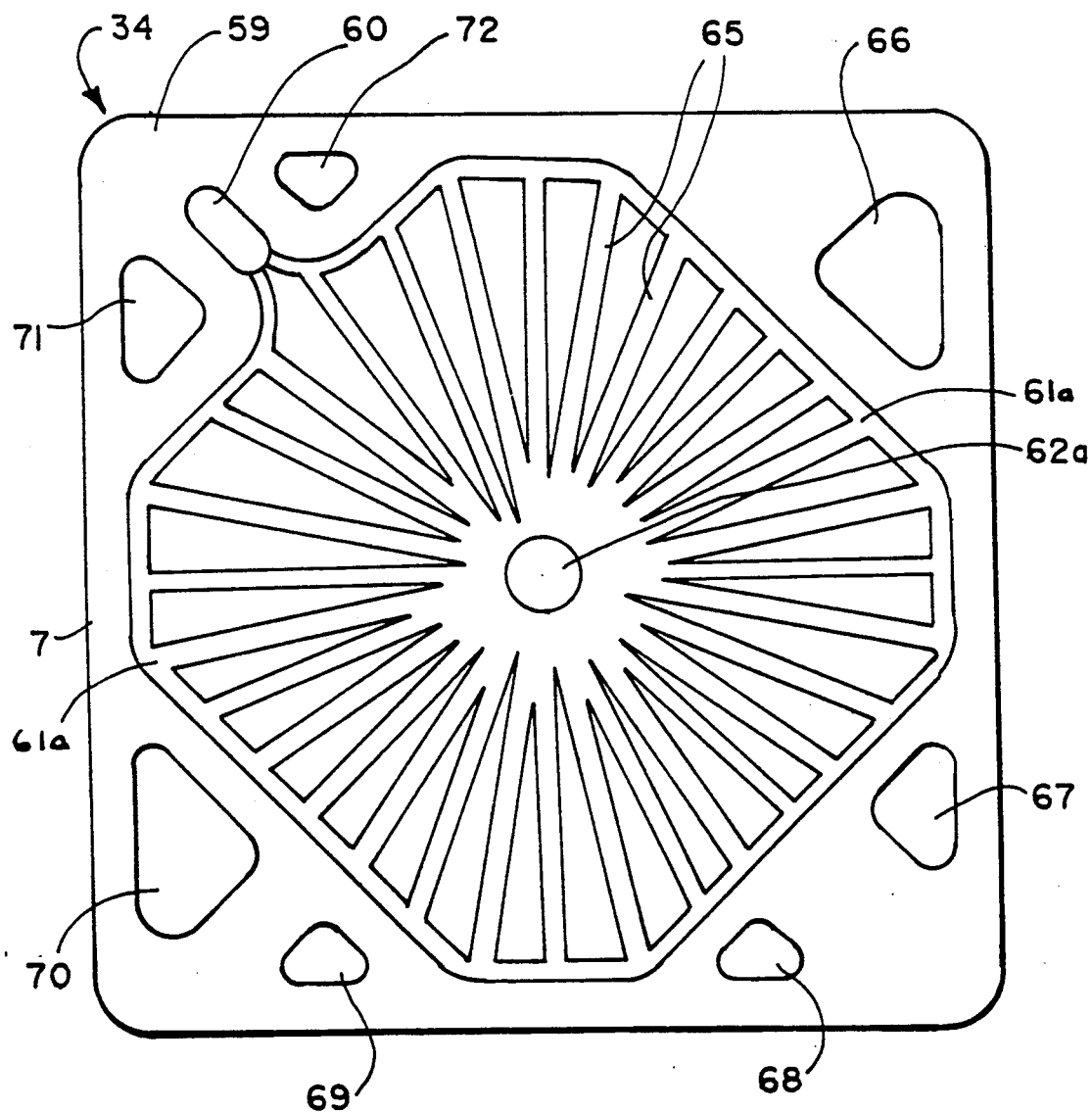
FIG. 4A is a top plan view of a coolant flow field plate having a wagon-wheel flow pattern in accordance with the present invention.

Channels 65 are preferably spaced closely together and may assume a serpentine or other pattern besides a straight line rib-cage in order to cover the maximum area on the plate. For example, channels 65 could be arranged in a wagon-wheel pattern, with the coolant flowing radially from fluid distribution channels 61a at the perimeter of plate 34 to a central exhaust manifold 62a, as illustrated in FIG. 4A. It is important, however, that the used or heated cooling fluid be collected near the center of the coolant flow field plate and not at or near the periphery of the plate. This coolant flow pattern maintains a relatively lower temperature at the periphery of the plate where the seals or gaskets are located.

The coolant inlet 60 is connected to a coolant supply not shown in the figures. If water is used as the coolant, the coolant outlet 62 may direct the heated water to the humidification section of the fuel cell where it can humidify the reactant gases prior to the gases being fed to the active section of the fuel cell stack.

Figure 5:
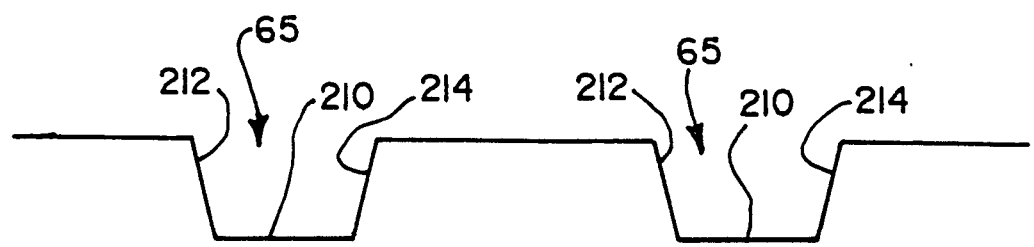
FIG. 5 is an enlarged sectional view taken in the direction of arrows 5—5 in FIG. 4, showing the configuration of the channels formed in the coolant flow field plate.

FIG. 5 is a cross sectional view of the preferred structure of the coolant flow channels 65 shown in FIG. 4. As shown in FIG. 5, channels 65 comprise a bottom wall 210 and opposing side walls 212, 214 that diverge outwardly from bottom wall 210. The flat surface of the adjacent plate (not shown in FIG. 5) forms a top wall to contain coolant fluid within channels 65.

While particular elements and applications of the present invention have been shown and described, it will be understood, of course, that the invention is not limited thereto since modifications may be made by those skilled in the art, particularly in light of the foregoing teachings. It is therefore contemplated by the appended claims to cover such modifications and incorporate those features which come within the scope and spirit of the invention.

What is claimed is:

1. A coolant flow field plate for use in association with a solid polymer fuel cell comprising in a major surface thereof:
   a coolant inlet;
   a coolant outlet;
   at least one coolant distribution channel in fluid communication with said coolant inlet and disposed in said major surface near the perimeter of said coolant flow field plate;
   at least one central exhaust channel extending along a diagonal of said coolant flow field plate, said central exhaust channel proximate to the center of said coolant flow field plate and in fluid communication with said coolant outlet; and
   a plurality of coolant flow channels extending from said at least one coolant distribution channel to said central exhaust channel.

2. The coolant flow field plate of claim 1 wherein said coolant flow channels are substantially parallel and extend substantially perpendicularly to said central exhaust channel.

3. The coolant flow field plate of claim 1 wherein said plate is formed from a rigid, electrically conductive material.

4. The coolant flow field plate of claim 1 wherein each of said channels comprises a bottom wall and opposing side walls diverging outwardly from said bottom wall.

5. A coolant flow field plate for use in association with a solid polymer fuel cell comprising in a major surface thereof:
   a coolant inlet;
   a coolant outlet;
   at least one coolant distribution channel in fluid communication with said inlet and disposed in said major surface near the perimeter of said coolant flow field;
   a central exhaust channel disposed proximate to the center of said coolant flow field plate and in communication with said coolant outlet; and
   a plurality of coolant flow channels extending substantially radially between said at least one coolant distribution channel and said central exhaust channel.

* * * * *